United States Patent
Parrish et al.

(10) Patent No.: US 7,015,715 B2
(45) Date of Patent: Mar. 21, 2006

(54) HYBRID GAP MEASUREMENT CIRCUIT

(75) Inventors: William J. Parrish, Santa Barbara, CA (US); Jeffrey B. Barton, Goleta, CA (US); Naseem Y. Aziz, Goleta, CA (US); Adrienne N. Costello, Santa Barbara, CA (US)

(73) Assignee: Indigo Systems Corporation, Goleta, CA (US)

( * ) Notice: Subject to any disclaimer, the term of this patent is extended or adjusted under 35 U.S.C. 154(b) by 273 days.

(21) Appl. No.: 10/395,431

(22) Filed: Mar. 24, 2003

(65) Prior Publication Data

US 2004/0189328 A1    Sep. 30, 2004

(51) Int. Cl.
  *G01R 31/02* (2006.01)
(52) U.S. Cl. ............... 324/765; 324/763; 324/158.1
(58) Field of Classification Search ............... 324/765, 324/158.1, 769, 661, 678, 686, 676, 663, 324/671, 672, 673; 361/277, 287, 290
See application file for complete search history.

(56) References Cited

U.S. PATENT DOCUMENTS

| 4,397,078 | A  | * | 8/1983  | Imahashi ............... 324/662 |
| 4,841,224 | A  | * | 6/1989  | Chalupnik et al. ...... 324/662 |
| 5,416,424 | A  | * | 5/1995  | Andermo ............... 324/684 |
| 6,323,660 | B1 | * | 11/2001 | Kunc et al. ............ 324/661 |
| 6,388,452 | B1 | * | 5/2002  | Picciotto .............. 324/663 |
| 6,646,453 | B1 | * | 11/2003 | Muller et al. .......... 324/671 |
| 6,756,791 | B1 | * | 6/2004  | Bhushan et al. ........ 324/671 |

* cited by examiner

*Primary Examiner*—Jermela Hollington
*Assistant Examiner*—Jimmy Nguyen
(74) *Attorney, Agent, or Firm*—MacPherson Kwok Chen & Heid LLP; Greg J. Michelson (57) ABSTRACT

Systems and methods are disclosed for measuring a distance (or gap) between substrates of a hybrid semiconductor. The measurements may be made during a hybridization process to, for example, provide alignment feedback during the hybridization process. The measurements may also be made after the hybridization process to further calibrate the process or to provide information useful for further processing operations.

17 Claims, 8 Drawing Sheets

HYBRID GAP MEASUREMENT CIRCUIT

TECHNICAL FIELD

The present invention relates generally to semiconductor processing and, more particularly, to a hybrid gap measurement circuit utilized to measure a distance between substrates, such as during or after a hybridization process.

BACKGROUND

Hybridization is a known semiconductor process that is typically performed to electrically couple two substrates to form a hybrid semiconductor. During hybridization, the two substrates must be maintained parallel to each other as they are brought together to allow a good connection to form between bump bonds or other types of mechanical and/or electrical connectors that are positioned generally between the substrates.

Failure to maintain the substrates in a parallel configuration during hybridization may result in misalignment, a poor electrical and/or mechanical connection, or damage to one or both of the substrates. For example, as the substrates approach each other during hybridization, the electrical connectors may be properly joined between substrates in one corner, but the electrical connectors between substrates in the opposite corner may still be separated and fail to form a connection or have a poor connection upon completion of the hybridization due to a failure to maintain a parallel alignment of the substrates' surfaces. Furthermore, mechanical damage may occur to the substrates during hybridization due to excessive force being applied to one or two corners of the substrates as they are brought together due to the parallel misalignment.

One technique for measuring substrate alignment is to optically measure the gap between the substrates at one or more locations around the hybrid semiconductor after the hybridization process has been completed. This information may be used to calibrate the hybridization equipment or may be useful for further processing. However, the optical measurements may have a large degree of uncertainty associated with them. Furthermore, no measurements are taken during the hybridization process to correct for misalignment during the hybridization process. As a result, there is a need for systems and methods that provide alignment information during and/or after hybridization.

SUMMARY

Systems and methods are disclosed herein, in accordance with one or more embodiments of the present invention, to measure a distance (also referred to as a gap or a gap distance) between substrates at one or more locations during and/or after hybridization. For example, in accordance with one embodiment, a hybrid gap measurement circuit is positioned at each corner of a substrate to measure a distance between the substrate and another substrate as it approaches during hybridization. By comparing the distance measurements at each corner during hybridization, the substrates can be maintained parallel to each other and alignment errors can be corrected to prevent damage to the substrates and allow proper connections to form between the substrates. Furthermore, the hybrid gap measurement circuits may be employed after hybridization to measure the final distance between substrates at each corner to provide information for calibration of hybridization equipment or for further processing of the substrates (i.e., the hybrid).

More specifically, in accordance with one embodiment of the present invention, a hybrid semiconductor includes a first substrate; a second substrate coupled to the first substrate; and a circuit, coupled to the first substrate, adapted to measure a distance between the first substrate and the second substrate.

In accordance with another embodiment of the present invention, a semiconductor substrate includes a metal layer; a contact pad disposed adjacent to the metal layer; and means coupled to the contact pad for indicating a distance between the contact pad and a second semiconductor substrate in close proximity to the contact pad.

In accordance with another embodiment of the present invention, a method of determining a distance between a first and second substrate includes providing a contact pad on the first substrate; and determining a distance between the first substrate and the second substrate based on a capacitance between the contact pad and the second substrate.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

The preferred embodiments of the present invention and their advantages are best understood by referring to the detailed description that follows. It should be appreciated that like reference numerals are used to identify like elements illustrated in one or more of the figures.

DETAILED DESCRIPTION

Figure 1:
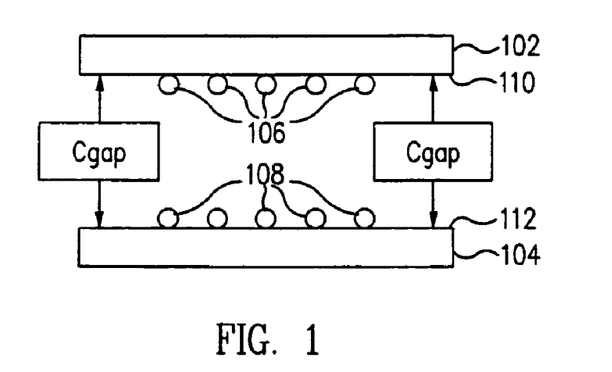
FIG. 1 is a side view of two substrates during a hybridization process, which illustrates a hybrid gap measurement technique in accordance with an embodiment of the present invention.

FIG. 1 is a side view of two substrates during a hybridization process, which illustrates a hybrid gap measurement technique in accordance with an embodiment of the present invention. Specifically, FIG. 1 includes substrates 102 and 104 that are being brought together during the hybridization process to join respective connectors 106 and 108 (e.g., leads, terminals, bump bonds, or ball grid arrays) to each other.

As discussed above, substrates 102 and 104 must be parallel to each other along their respective surfaces 110 and 112 to properly join connectors 106 to connectors 108. If misalignment errors are present, all of connectors 106 may not be properly joined to corresponding connectors 108 and damage to substrates 102 and 104 may occur, depending upon the degree of the misalignment.

As shown in FIG. 1, a measurement technique is disclosed, in accordance with an embodiment of the present invention, to measure a distance between substrates 102 and 104 at one or more locations. By measuring or monitoring a distance or gap between substrates 102 and 104 periodically or constantly at one or more locations, surfaces 110 and 112 of respective substrates 102 and 104 may be maintained parallel to each other during the hybridization process.

The measurement technique shown in FIG. 1 includes monitoring a capacitance (labeled Cgap) at the chosen measurement locations. Because the capacitance will vary as the distance between substrates 102 and 104 changes, measuring the value of the capacitance provides a measurement of the distance. By knowing the distance or gap that exists at various locations between substrates 102 and 104, adjustments may be made to maintain proper alignment of substrates 102 and 104 during the hybridization process. Furthermore, the hybridization process may be stopped or the equipment recalibrated if the distance measurements indicate an error or that an unacceptable alignment exists. The gap measurement may also be performed after completion of the hybridization process to provide further calibration information or to provide information that may be useful for further processing steps of the hybrid semiconductor.

Figure 2:
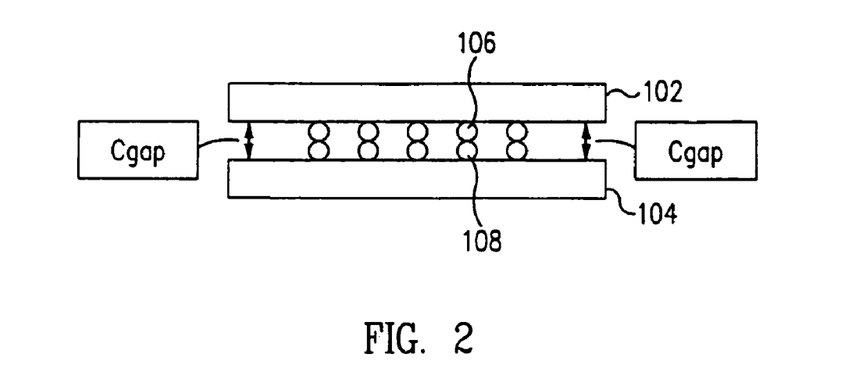
FIG. 2 is a side view of two substrates, which form a hybrid, along with a hybrid gap measurement technique in accordance with an embodiment of the present invention.

FIG. 2 is a side view of two substrates, which form a hybrid, along with a hybrid gap measurement technique in accordance with an embodiment of the present invention. Substrates 102 and 104 form a hybrid or hybrid semiconductor that results from completion of the hybridization process discussed in reference to FIG. 1. As shown, connectors 106 and 108 have been joined together in a corresponding fashion to provide an electrical and/or mechanical connection between substrate 102 and substrate 104.

FIG. 2 illustrates that the same techniques discussed above in reference to FIG. 1 may be employed to provide a measurement of the distance or gap that exists between substrates 102 and 104 of the hybrid resulting from the hybridization process. By measuring the capacitive value that exists between substrates 102 and 104, an accurate measurement of the distance between substrates 102 and 104 may be determined at various designated locations. The distance measurements may be utilized to further calibrate hybridization equipment or may be useful for further processing operations performed on the hybrid.

Figure 3:
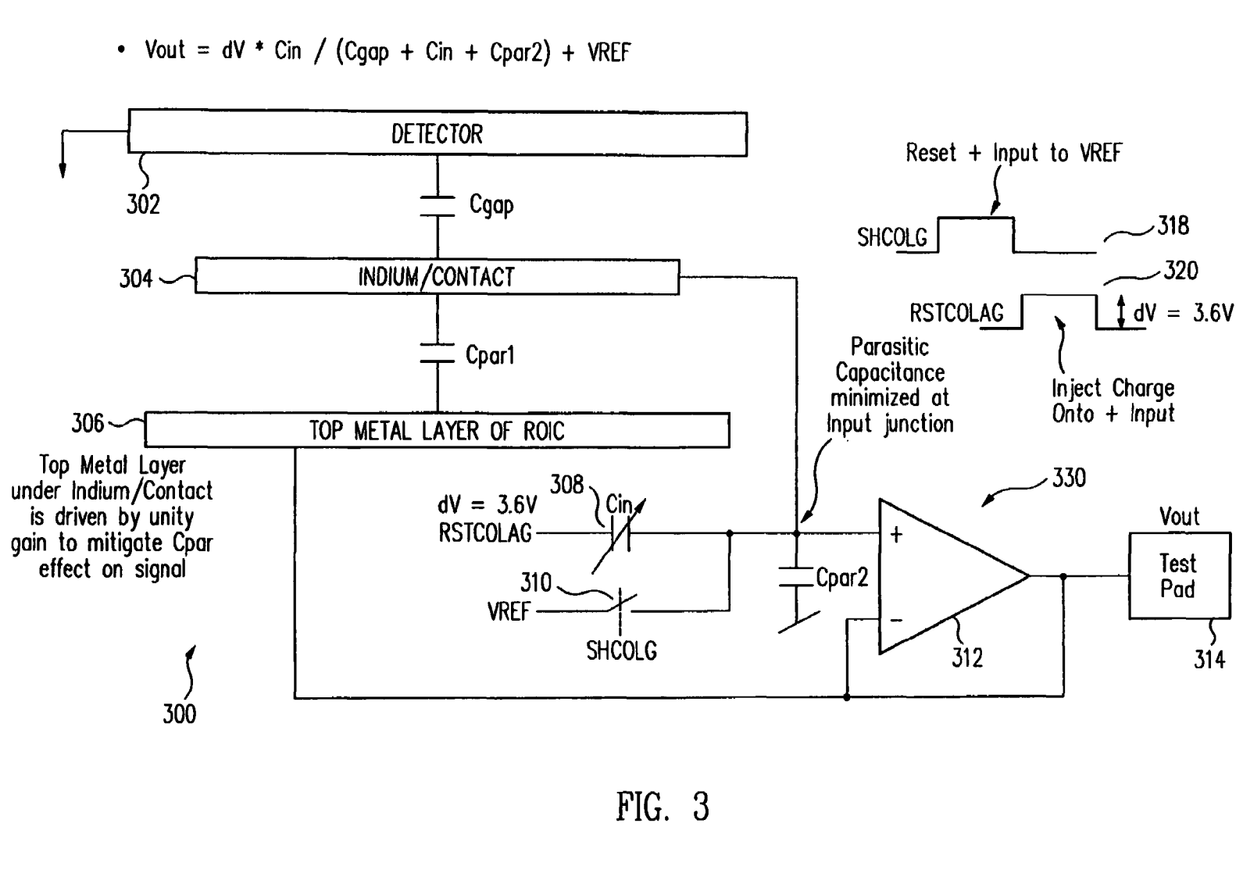
FIG. 3 shows a hybrid gap measurement system in accordance with an embodiment of the present invention.

FIG. 3 shows a hybrid gap measurement system 300 in accordance with an embodiment of the present invention. System 300 may be employed during a hybridization process for substrates 302 and 306 or after completion of the hybridization process to measure a gap or distance between substrates 302 and 306 of the resulting hybrid semiconductor. System 300 is applicable for any type of hybridization process, such as for example as illustrated in FIG. 3 for application during manufacture of an infrared hybrid sensor (also known as a focal plane array or hybrid detector array).

As shown for example, a detector (e.g., an infrared detector represented by substrate 302) is joined with a readout integrated circuit (ROIC, represented by substrate 306) during hybridization to form the infrared hybrid sensor. A circuit 330 monitors a distance between the detector and the ROIC at one or more locations to provide alignment information that can be used to assure proper formation of the infrared hybrid sensor and provide accurate distance information at these locations after completion of the hybridization process.

System 300 includes substrate 302, a contact 304, substrate 306, and circuit 330 that includes a capacitor 308 (labeled Cin), a switch 310, and a buffer 312. Circuit 330 is employed to measure a capacitance or a change in capacitance at a location between substrates 302 and 306. By measuring the capacitance between substrates 302 and 306, circuit 330 provides the ability to estimate a distance or a hybrid gap between substrates 302 and 306, because the capacitance changes with the distance (i.e., gap distance).

The location between substrates 302 and 306 may be designated by contact 304 (e.g., a contact pad or a contact area), which is coupled to substrate 306. For example, substrate 306 may include a metal layer overlain with an insulating layer that may be overlain with an array of connectors (e.g., indium bump bonds or other types of electrical or mechanical connectors that correspond with connectors on substrate 302). Consequently as an example, contact 304 may be formed on the insulating layer at the same time as the formation of the connectors (not shown) and may be made of a similar material as the connectors (e.g., indium or other types of conductors or metal contacts).

The capacitance between substrates 302 and 306, labeled Cgap for a gap capacitance, is then measured by circuit 330. Specifically, buffer 312 is coupled to contact 304 and to substrate 306 (e.g., at the metal layer), with substrate 302 grounded to the same ground plane as buffer 312 or otherwise electrically coupled to circuit 330 to complete the circuit. Buffer 312 may be represented by a voltage follower or a unity gain amplifier.

A reference voltage (VREF) is applied to a positive input terminal of buffer 312, under control of switch 310 that is controlled by a switch control signal (labeled SHCOLG), to provide a known reference voltage to buffer 312 and reset the positive input terminal to the reference voltage value. When switch 310 opens, a second reference voltage (labeled RSTCOLAG) is applied (i.e., injects a charge) to the positive input terminal via capacitor 308 (e.g., a variable capacitor).

A timing diagram (i.e., waveforms 318 and 320) is shown in FIG. 3 to generally illustrate the timing of the application of the reference voltage (VREF) onto the positive input terminal of buffer 312, which is then followed by the application of the second reference voltage (RSTCOLAG). This timing sequence may be constantly repeated or repeated at desired intervals to provide an output voltage (labeled Vout) from buffer 312, which may be provided externally via a test pad 314. As an example, the reference voltage (VREF) and the second reference voltage (RSTCOLAG, which has a step voltage of dV as indicated by waveform 320) may have a voltage of 1.2 V and 3.6 V (i.e., dV=3.6 V), respectively.

The parasitic capacitances that may be present in system 300 may be reduced by applying the output voltage (Vout) to substrate 306. For example, a parasitic capacitance (represented in FIG. 3 by a capacitor labeled Cpar1) that may exist between contact 304 and substrate 306 (e.g., due to an insulating layer being present between the metal layer of substrate 306 and contact 304) may have its effect on the output signal (Vout) minimized by applying the output signal (Vout) to substrate 306 (e.g., at the metal layer).

Thus for example, the metal layer of substrate 306 may be driven by unity gain to mitigate the parasitic capacitance Cpar1 that may be present between contact 304 and substrate 306. Buffer 312 may also have a parasitic capacitance (represented by a capacitor labeled Cpar2) at its positive input terminal. The resulting value of the output signal (Vout) may be estimated by the following equation: Vout=dV*Cin/(Cgap+Cin+Cpar2)+VREF, where dV and VREF are the voltage values of the reference voltage (VREF) and the second reference voltage (RSTCOLAG) and Cin, Cgap, and Cpar2 are capacitance values.

Figure 4:
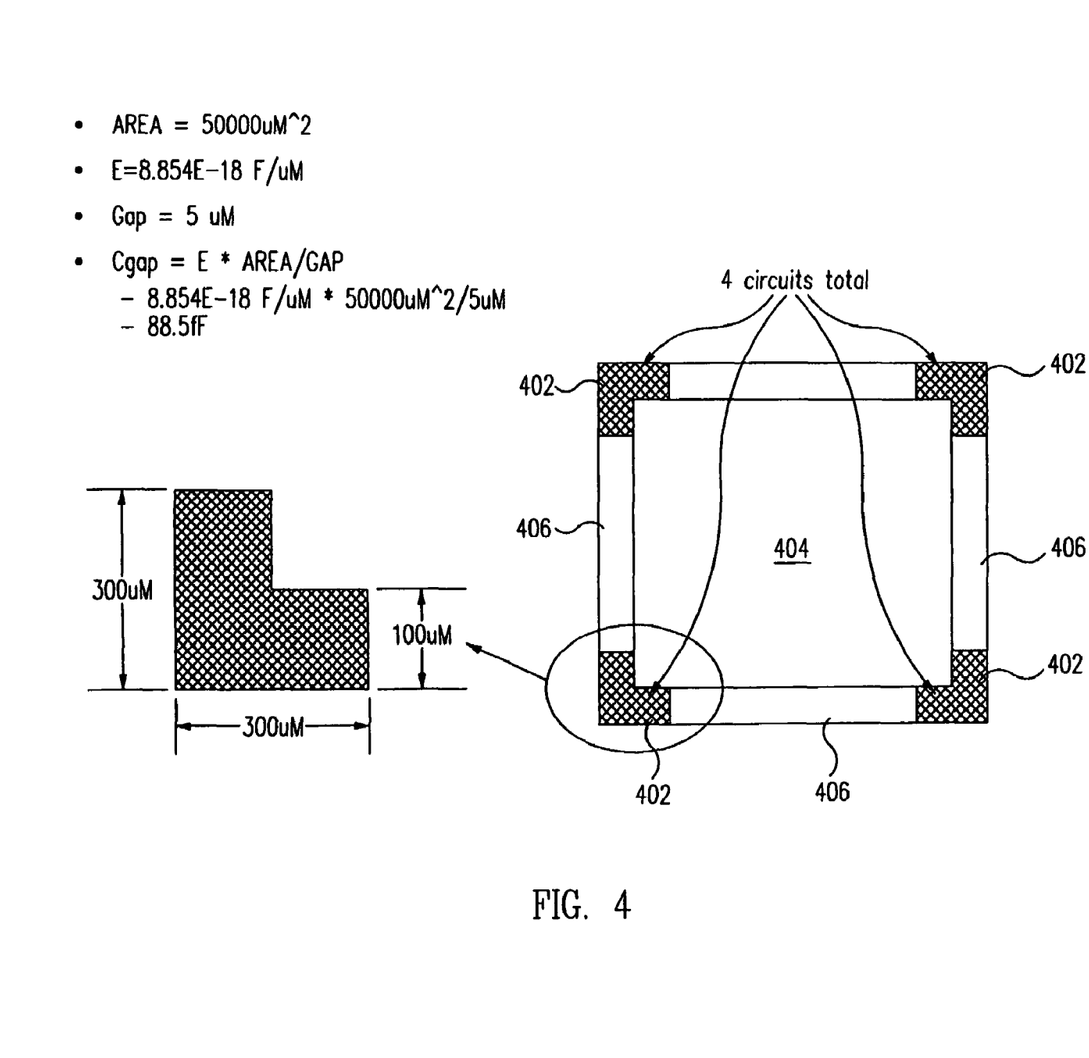
FIG. 4 shows exemplary contact area locations for a hybrid gap measurement system in accordance with an embodiment of the present invention.

Contact 302 may be positioned at one or more locations on substrate 306, with each contact 302 having a corresponding circuit 330. For example, FIG. 4 shows exemplary contacts 402 for a hybrid gap measurement system in accordance with an embodiment of the present invention. Contacts 402 are positioned on the corners of a substrate 404 with exemplary dimensions, as shown, to provide an area of 50,000 $\mu m^2$. As an example, contacts 402 may be located along with a ground plane (e.g., a common detector voltage (VDETCOM) ring) that forms a ring 406 along a border of substrate 404.

A gap capacitance (Cgap) may be estimated for one of contacts 402 based on the following equation: Cgap=E*Eo*Area/Gap, where E is the dielectric constant and Eo is the permittivity constant. For example, given Eo equals $8.854*10^{-18}$ F/$\mu m$, E is approximately one for air, the contact area is approximately 50,000 $\mu m^2$, and the Gap (i.e., distance) between contact 402 on substrate 404 and a substrate (not shown) after hybridization or during the hybridization process is 5 $\mu m$, then the gap capacitance (Cgap) is approximately 88.5 fF.

Substrate 404 may represent substrate 306 of FIG. 3, such that substrate 306 includes four contacts 304 (e.g., similar to contacts 402), one on each corner of substrate 306. One of circuits 330 may be provided for each contact 304. The output voltages (Vout) from each of circuits 330 would be monitored via their corresponding test pads 314 and utilized as discussed herein, such as to provide information during or after the hybridization process.

Figure 5:
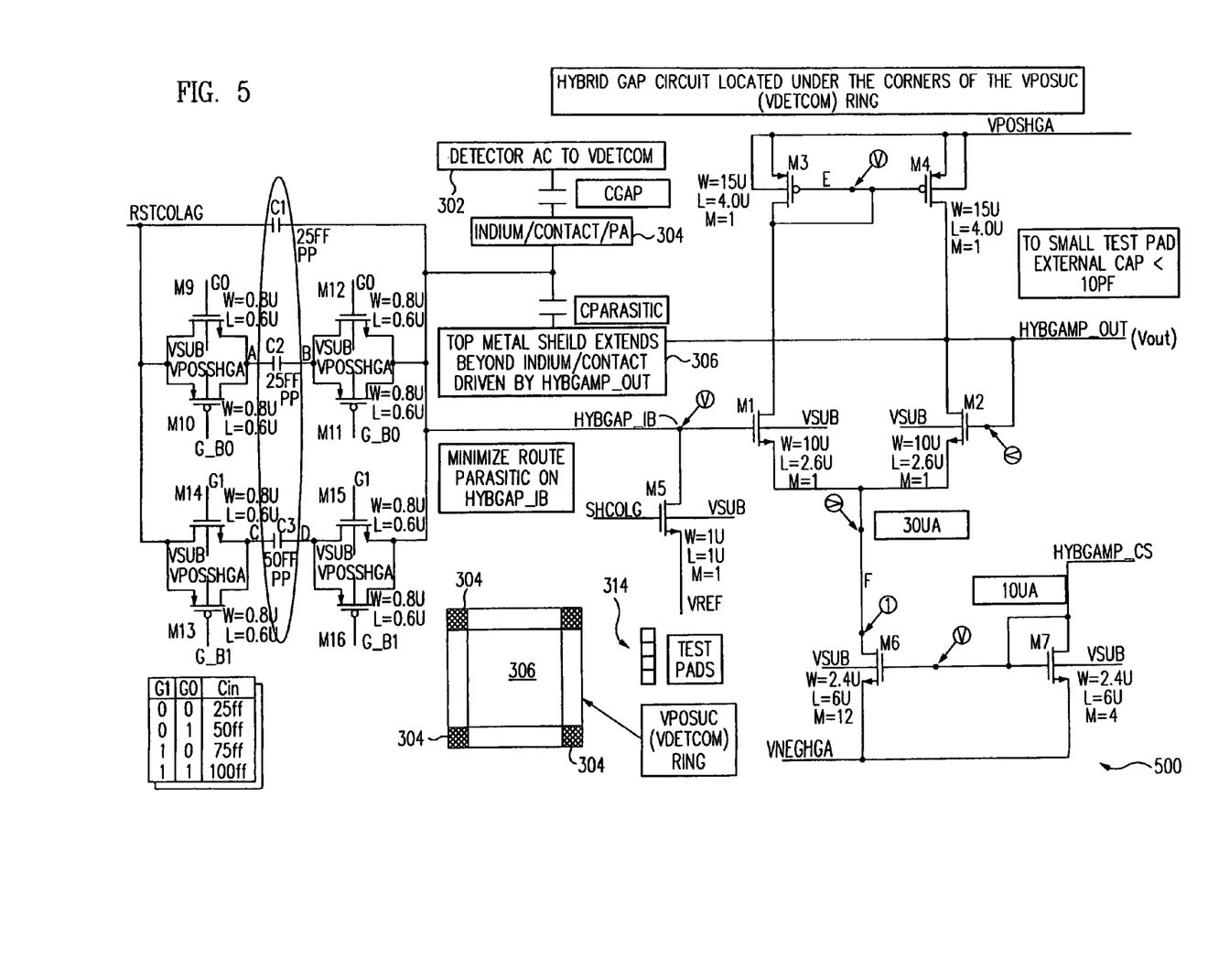
FIG. 5 shows a hybrid gap measurement circuit in accordance with an embodiment of the present invention.

FIG. 5 shows a hybrid gap measurement circuit 500 in accordance with an embodiment of the present invention. Circuit 500 shows an exemplary detailed circuit diagram for hybrid gap measurement system 300 (FIG. 3). For example, capacitor 308 (FIG. 3) may be implemented by providing capacitors C1, C2, and C3, which are arranged in parallel (and circled) as shown in FIG. 5. Capacitors C2 and C3 are selectable via transmission gates (formed by transistors M9 through M16) that are controlled by control signals G0 and G1 (and their corresponding complementary signals G_B0 and G_B1, respectively) to provide, along with capacitor C1, exemplary selectable capacitance values for Cin of 25, 50, 75, or 100 fF.

A transistor M5 (representing switch 310 of FIG. 3), under control of switch control signal (SHCOLG), controls the assertion of the voltage reference signal (VREF) onto the positive input terminal (labeled HYBGAP_1B) of buffer 312. Buffer 312 is implemented by transistors M1–M4, M6, and M7. A supply voltage (labeled VPOSHGA) is supplied to the transistors M3 and M4 and a current reference (labeled HYBGAMP_CS, e.g., of 10 $\mu A$) is supplied to the transistors M6 and M7, whose source terminals are coupled to a reference voltage (labeled VNEGHGA, e.g., of zero volts). The transistors M6 and M7 form a current mirror that maintains, for example, approximately 30 $\mu A$ flowing from the transistors M1 and M2 and through the transistor M6.

As noted above and indicated in FIG. 5, multiple locations between substrates 302 and 306 may be monitored. Consequently, a corresponding circuit 500 may be implemented along with a corresponding contact 304 to measure a gap distance at each of the designated locations. For example, as shown in FIG. 5, a distance measurement may be performed at each corner of substrate 306, with the result supplied via corresponding test pads 314.

Figure 6:
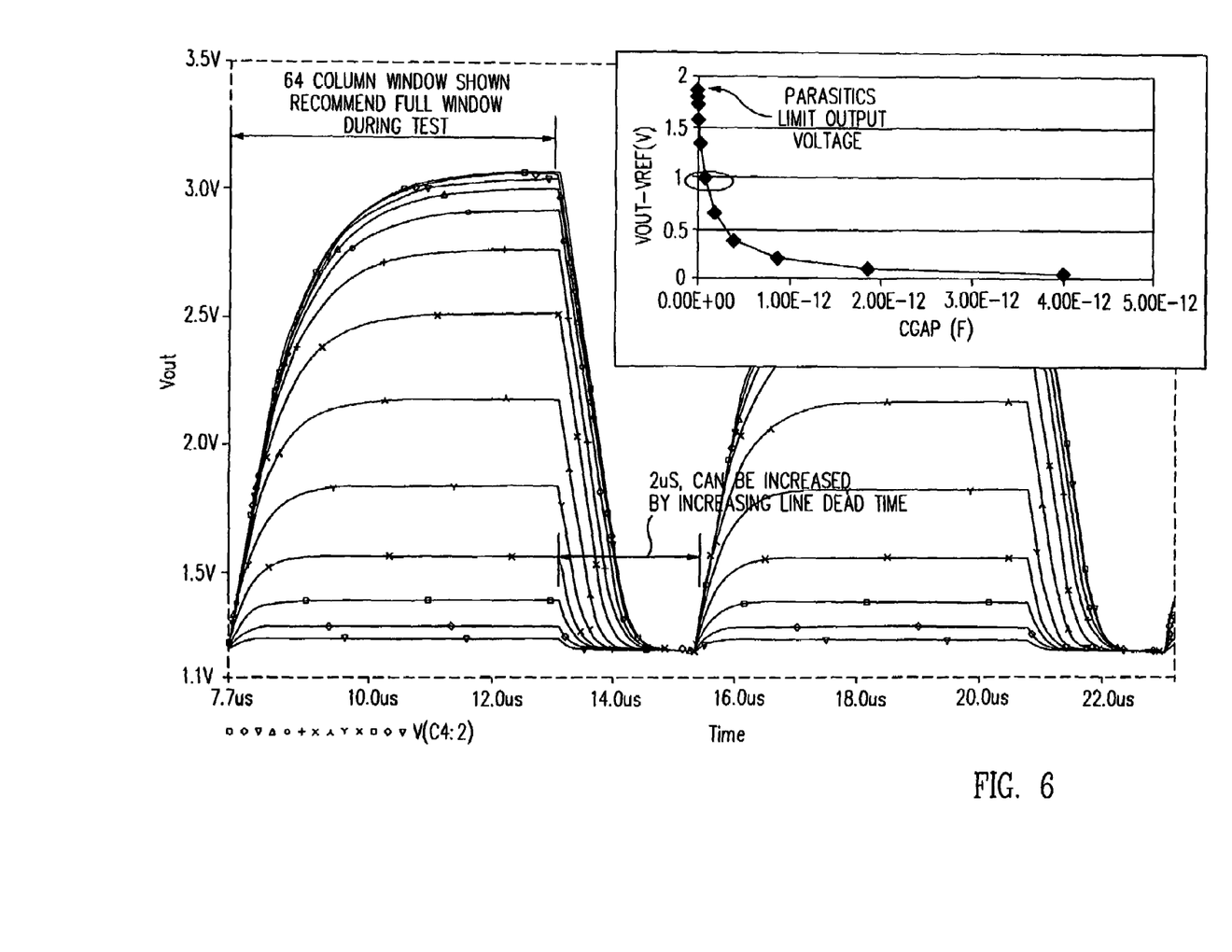
FIG. 6 shows a plot of an exemplary output signal for the hybrid gap measurement circuit of FIG. 5.

The output voltage (Vout) from buffer 312 (Vout is also labeled HYBGAMP_OUT in FIG. 5) is supplied to substrate 306 and may also be supplied via one of the test pads (e.g., to external test or processing equipment). As illustrated in FIG. 6, the output voltage (Vout) of circuit 500 resembles a square wave at the line rate (i.e., frequency or period) with amplitude (referenced to reference voltage (VREF)) inversely proportional to the gap capacitance and proportional to the gap distance. The curves shown in FIG. 6 illustrate various values of the output voltage (Vout) as a distance between the substrates (e.g., between substrate 302 and 306) varies (i.e., the output voltage (Vout) decreases as the distance decreases).

The reference voltage (VREF) value is approximately 1.2 V, as shown in FIG. 6. The accompanying inset plot in FIG. 6 serves to illustrate that a value of the output voltage (Vout) minus the reference voltage (VREF) decreases as the distance between the substrates decreases, while the capacitance measured between the substrates increases.

Figure 7:
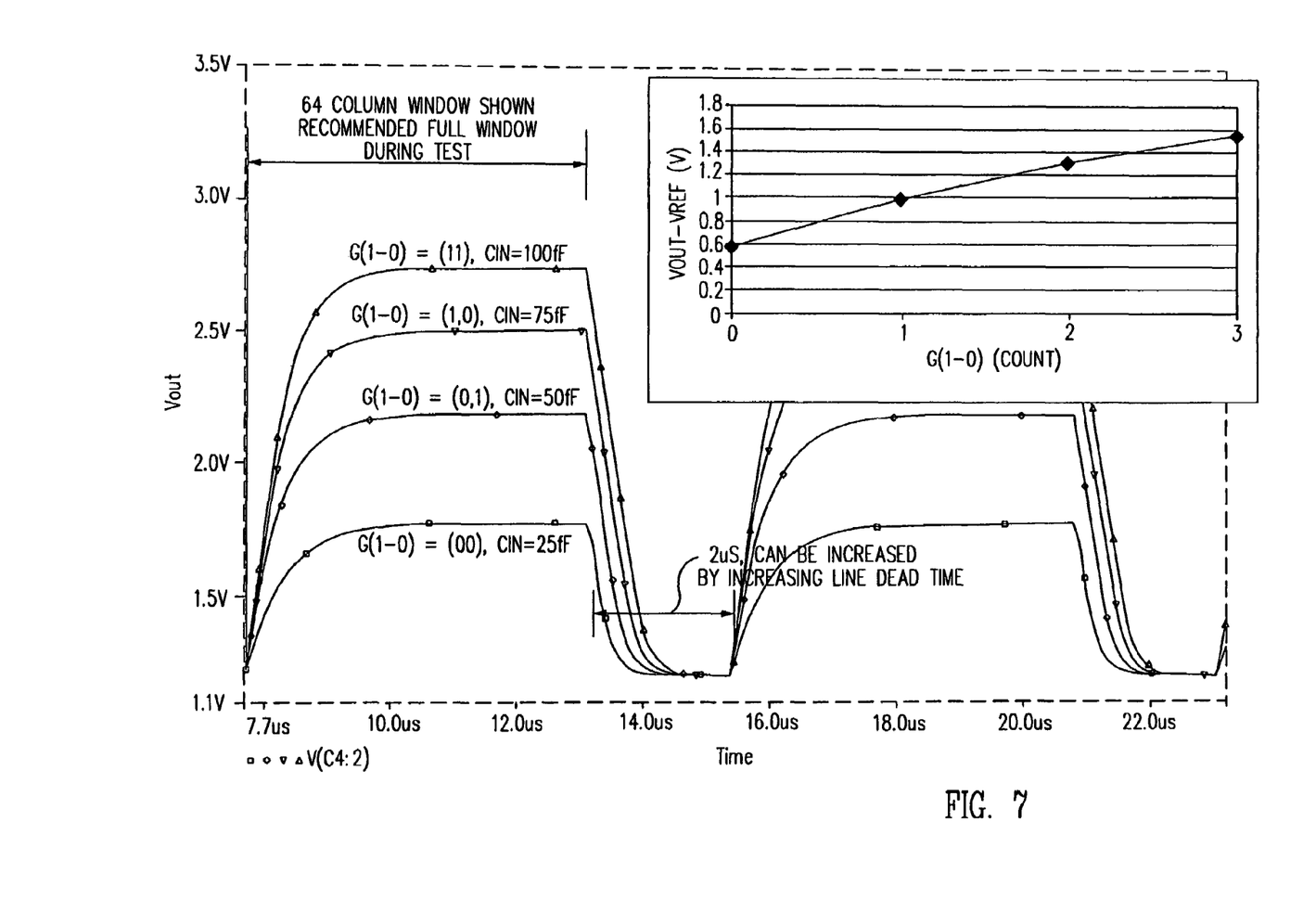
FIG. 7 shows a plot of an exemplary output signal as input capacitance varies for the hybrid gap measurement circuit of FIG. 5.

FIG. 7 shows the output voltage (Vout) as input capacitance (Cin) varies for circuit 500 of FIG. 5. As the input capacitance (Cin, e.g., capacitor 308 of FIG. 3 or represented by capacitor C1 and selectable capacitors C2 and C3 in FIG. 5) is increased, a value of the output voltage (Vout) increases also.

Figure 8:
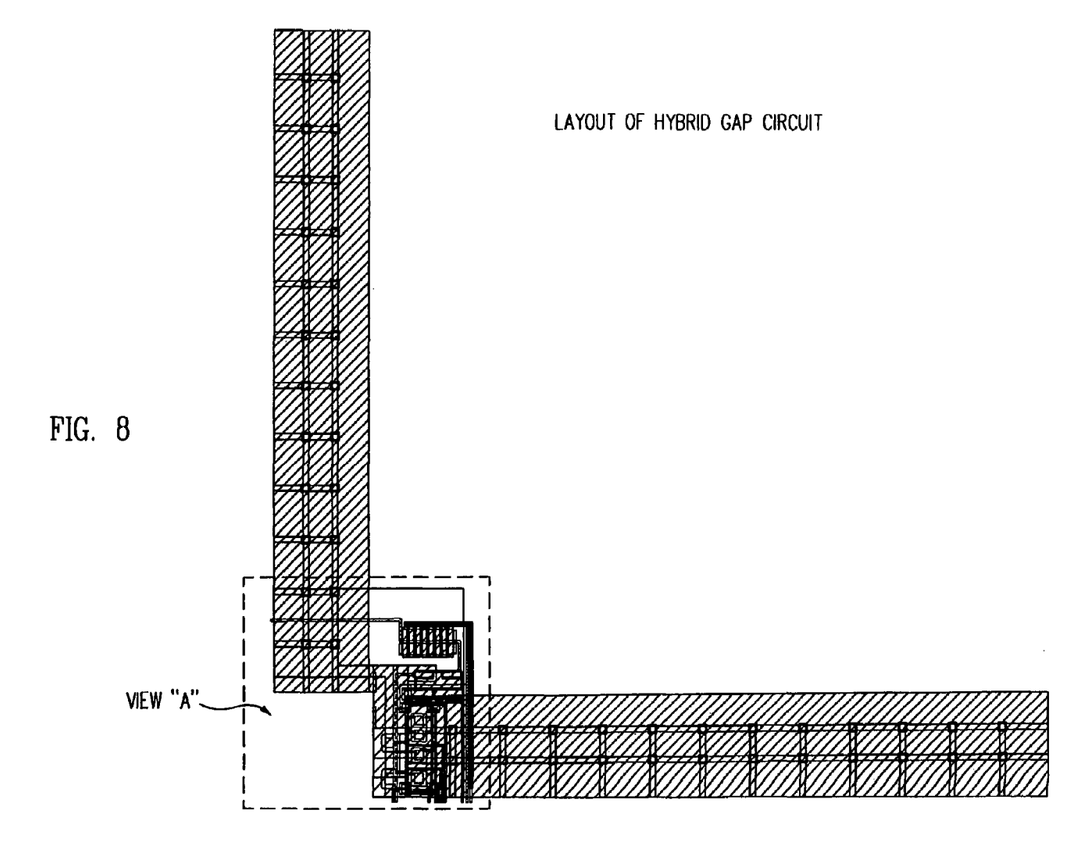
FIG. 8 shows an exemplary circuit layout located in a corner of a semiconductor containing the hybrid gap measurement circuit of FIG. 5.
Figure 9:
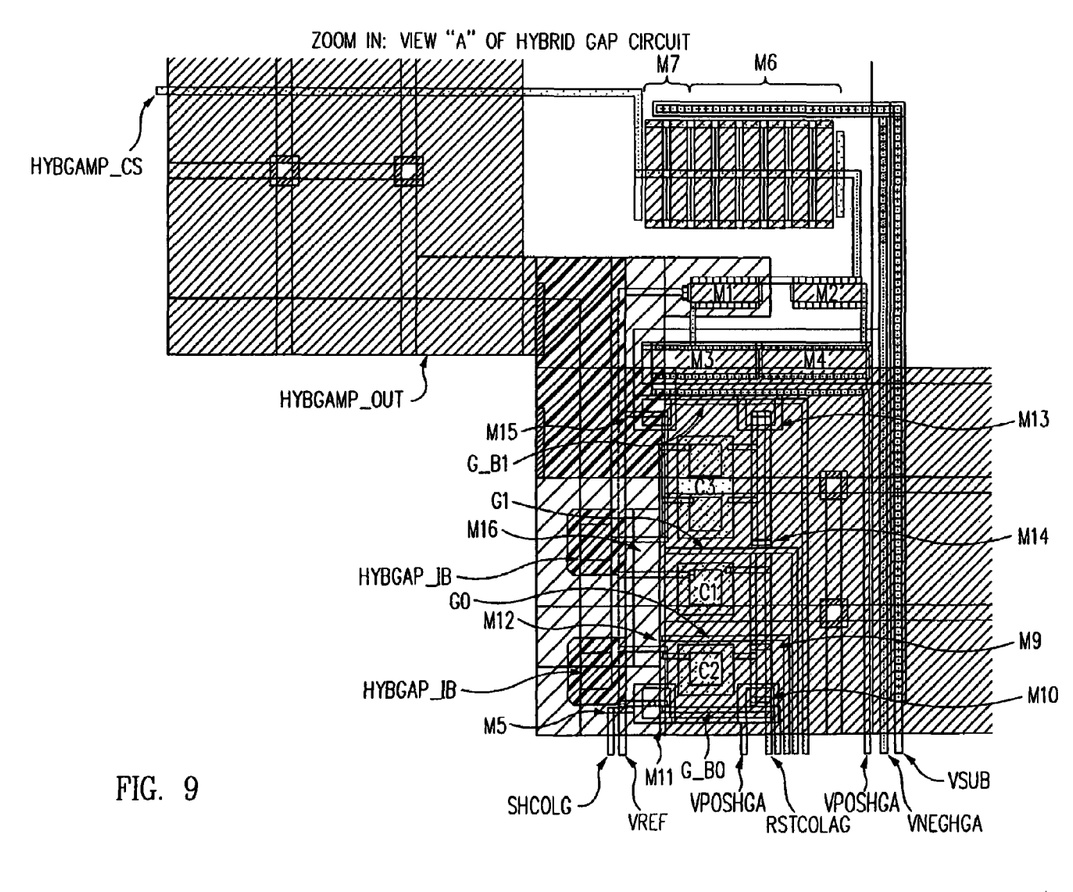
FIG. 9 shows a more detailed view of the circuit layout of FIG. 8.

FIG. 8 shows an exemplary circuit layout located in a corner of a semiconductor (e.g., semiconductor 306 of FIGS. 3 and 5) containing hybrid gap measurement circuit 500 of FIG. 5. FIG. 9 shows a more detailed view of the circuit layout of FIG. 8 for the portion identified as View "A". The layout elements labeled in FIG. 9 (e.g., M1–M7, M9–M15, C1–C3, and RSTCOLAG) refer to corresponding circuit elements or leads for corresponding signals that are identified in FIG. 5.

Embodiments described above illustrate but do not limit the invention. It should also be understood that numerous modifications and variations are possible in accordance with the principles of the present invention. Accordingly, the scope of the invention is defined only by the following claims.

We claim:
1. A hybrid semiconductor comprising:
   a first substrate comprising:
      a metal layer;
      an insulating layer adjacent to the metal layer; and
      a contact adjacent to the insulating layer;
   a second substrate coupled to the first substrate; and
   a circuit, coupled to the metal layer and to the contact of the first substrate, adapted to measure a distance between the first substrate and the second substrate, wherein the distance measured by the circuit is based on a capacitance between the contact and the second substrate, with the capacitance based on an area of the contact and the distance between the first substrate and the second substrate, and wherein the circuit comprises;
      a buffer having a first and second input terminal and an output terminal that provides the output signal, wherein the output terminal is coupled to the second input terminal and to the metal layer of the first substrate, and the first input terminal is coupled to the contact;

a switch coupled to the first input terminal to selectively assert a first reference signal to the first input terminal; and a capacitor coupled to the first input terminal, the capacitor adapted to receive a second reference voltage after the switch opens to deassert the first reference signal.

2. The hybrid semiconductor of claim 1, wherein the circuit provides an output signal to the metal layer of the first substrate.

3. The hybrid semiconductor of claim 1, wherein the capacitor is a variable capacitor.

4. The hybrid semiconductor of claim 1, further comprising a plurality of the circuits and a corresponding plurality of the contacts, each of the contacts disposed at a specific location on the first substrate, and wherein each of the circuits are adapted to measure a distance between the corresponding contact and the second substrate.

5. The hybrid semiconductor of claim 1, wherein the first substrate comprises a readout integrated circuit, the second substrate comprises a detector, and the hybrid semiconductor comprises an infrared hybrid sensor.

6. The hybrid semiconductor of claim 1, wherein the second substrate is electrically coupled to the circuit via a voltage reference plane.

7. A semiconductor substrate comprising:
a metal layer;
a contact pad disposed adjacent to the metal layer; and
means coupled to the contact pad for indicating a distance between the contact pad and a second semiconductor substrate in close proximity to the contact pad, wherein the means for indicating a distance comprises a buffer adapted to provide an output signal corresponding to the distance based on a capacitance between the contact pad and the second semiconductor substrate, with the output signal provided to the metal layer to mitigate a parasitic capacitance.

8. The semiconductor substrate of claim 7, further comprising an insulating layer disposed between the metal layer and the contact pad.

9. The semiconductor substrate of claim 7, wherein the semiconductor substrate and the second semiconductor substrate are coupled together to form a hybrid semiconductor.

10. The semiconductor substrate of claim 7, wherein the semiconductor substrate further comprises;

a plurality of the contact pads; and
means coupled to corresponding ones of the contact pads to indicate a corresponding distance between the contact pads and the second semiconductor substrate in close proximity to the contact pads.

11. A method of determining a distance between a first and second substrate, the method comprising:
providing a contact pad on the first substrate; and
determining a distance between the first substrate and the second substrate based on a capacitance between the contact pad and the second substrate; wherein the determining comprises:
asserting a first reference voltage across the capacitance between the first substrate and the second substrate;
asserting a second reference voltage via a first capacitor across the capacitance after deasserting the first reference voltage; and
providing an output signal based upon a voltage drop across the capacitance.

12. The method of claim 11, further comprising providing the output signal to the first substrate to minimize a parasitic capacitance effect on the output signal.

13. The method of claim 11, wherein the capacitance is based on a surface area of the contact pad.

14. The method of claim 11, further comprising:
providing a plurality of contact pads at a corresponding plurality of locations on the first substrate; and
determining a distance between the first substrate and the second substrate at each of the locations based on a capacitance between the corresponding contact pad and the second substrate.

15. The method of claim 14, further comprising utilizing measurements of the distance at one or more of the locations during a hybridization process to determine if the first substrate and the second substrate are aligned properly.

16. The method of claim 15, further comprising adjusting an alignment between the first substrate and the second substrate during the hybridization process based on measurements of the distance between the first substrate and the second substrate.

17. The method of claim 14, further comprising utilizing measurements of the distance at one or more of the locations after a hybridization process to determine if the first substrate and the second substrate are aligned properly.

* * * * *